United States Patent
Hashimoto et al.

(10) Patent No.: US 6,627,896 B1
(45) Date of Patent: Sep. 30, 2003

(54) IMAGE SENSING APPARATUS (75) Inventors: Seiji Hashimoto, Yokohama (JP);
Osamu Yuki, Atsugi (JP); Toshiaki Endo, Atsugi (JP); Hidetoshi Hayashi, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 09/624,623

(22) Filed: Jul. 25, 2000

(30) Foreign Application Priority Data

Jul. 27, 1999 (JP) .......................... 11-212285

(51) Int. Cl.⁷ ............................................... G01T 1/20
(52) U.S. Cl. ............................ 250/370.11; 250/370.01; 250/370.09
(58) Field of Search ................ 250/370.01, 370.02, 250/370.06, 370.08, 370.09, 370.11, 370.14, 371

(56) References Cited

U.S. PATENT DOCUMENTS

| 5,308,235 A | 5/1994 | Kamitakahara et al. ..... 425/194 |
| 5,368,789 A | 11/1994 | Kamitakahara et al. .... 264/1.33 |
| 5,460,766 A | 10/1995 | Kamitakahara et al. ..... 264/167 |
| 5,629,524 A | 5/1997 | Stettner et al. ........ 250/370.09 |
| 5,648,660 A * | 7/1997 | Lee et al. .............. 250/370.09 |
| 5,661,309 A * | 8/1997 | Jeromin et al. ............. 250/580 |
| 5,804,832 A | 9/1998 | Crowell et al. ............. 250/850 |
| 5,912,942 A * | 6/1999 | Schick et al. .............. 378/98.8 |
| 6,031,891 A * | 2/2000 | Roos et al. ................ 378/98.2 |

FOREIGN PATENT DOCUMENTS

EP 0 603 709 6/1994

OTHER PUBLICATIONS

European Search Report dated Jul. 27, 2001 (Ref. No. 2730430).

* cited by examiner

Primary Examiner—Constantine Hannaher
Assistant Examiner—Timothy Moran
(74) Attorney, Agent, or Firm—Fitzpatrick, Cella, Harper & Scinto (57) ABSTRACT

An image sending apparatus has a conversion member for converting a radiation wave into visual light, an image sensing area having a plurality of pixels for converting the visual light converted by the converting member into an electrical signal, and a shielding member mounted in a partial area of the image sensing apparatus for shielding the radiation wave.

13 Claims, 5 Drawing Sheets

IMAGE SENSING APPARATUS

BACKGROUND OF THE INVENTION

1. Field of the Invention

The present invention relates to an image sensing apparatus for sensing radiation waves such as x-rays which can transmit through an object.

2. Related Background Art

Conventional image reading systems use, as one-dimensional line sensors and two-dimensional line sensors, reduction optical type CCD sensors using CCDS, CMOS sensors having an amplifier for amplifying electric charges accumulated in photoelectric conversion elements, equal magnification optical type CIS sensors using amorphous silicon (a-Si) or the like.

One of various types of such image sensors is an image sensing apparatus commonly used for sensing x-ray photographs. One of such apparatuses is an equal magnitude type image sensing apparatus which obtains image signals with a photoelectric conversion apparatus for converting x-rays, transmitted through an object and then propagated through optical fibers arranged two-dimensionally in parallel, into electric signals.

This image sensing apparatus is called an x-ray image sensor and has an x-ray scintillator formed on a fiber optic plate and adhered to an image sensor. For example, such an x-ray device using a CCD sensor is presented in the document "FIBER OPTIC PLATE WITH X-RAY SCINTILLATOR" published by Hamamatsu Photonics K. K.

With this x-ray image sensing apparatus, an x-ray scintillator converts an x-ray image of x-ray beams transmitted through an object into a visual ray image. Depending upon the material of the x-ray scintillator, about 30 to 70% of incident x-rays are absorbed, while some of the x-rays are not absorbed but instead are transmitted through the x-ray scintillator and become incident upon the sensor. X-rays incident upon the sensor may pass through the sensor substrate or be absorbed at the substrate potential. However, some of the x-rays incident upon the sensor are photoelectrically converted and are observed as bright points in an output image. In order to reduce such bright points, an x-ray image sensing apparatus which can absorb 90% or more of transmitted x-rays in an x-ray shield fiber optic plate has been proposed.

However, it is difficult to perfectly eliminate transmitted x-rays, and x-ray noise is generated at some occurrence frequency. This x-ray noise poses the following problems. An image sensing apparatus having optical black pixel areas is associated with a problem of a change in black levels of an image. This will be clarified with reference to FIG. 1.

Figure 1:
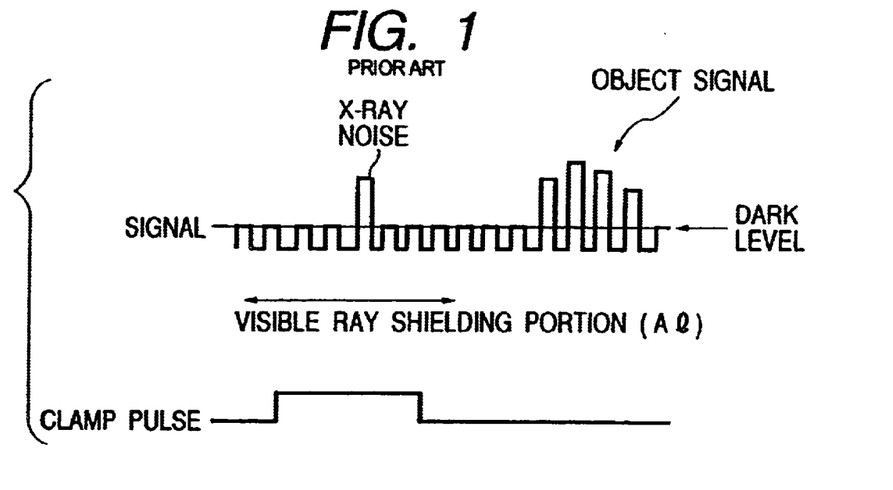
FIG. 1 shows waveforms of signals detected by a conventional image sensing apparatus.

A signal contains a dark signal in an optical black pixel area and an object image signal in a photoelectric conversion area. The optical black pixel area is covered with an Al layer or the like to shield visual light from the sensor. An x-ray transmits through the Al layer. Therefore, in optical black pixels into which x-rays enter, the level of the black pixel signal is not a black (i.e., dark) level but instead becomes noise, having a level higher than the black level, as shown in FIG. 1. Generally in an image sensing apparatus, this optical black level is clamped to set a black reference for an image signal. With such noise, the black level is clamped to a level on the brighter side. Therefore, in a horizontal line having optical black pixels into which x-rays enter, a horizontal strip noise appears in the image so that the image quality is degraded greatly.

If x-rays enter a peripheral circuit (such as a driver circuit or an output amplifier circuit) near the photoelectric conversion area, the image sensing apparatus may cause an erroneous operation. For example, a reset circuit in the drive circuit may generate noise which may temporarily stop the scanning operation or may shift the timing of a shift pulse. Other peripheral circuits may also generate noise due to the X-ray.

SUMMARY OF THE INVENTION

It is an object of the invention to improve the image quality by reducing image noise caused by radiation waves such as x-rays.

In order to achieve the above-described object, according to one aspect of the present invention, there is provided an image sensing apparatus comprising a converting member for converting a radiation wave into visual light, an image sensing area having a plurality of pixels for converting visual light converted by the converting member into an electric signal, and shielding means mounted in a partial area of the image sensing apparatus for shielding the radiation wave.

According to another aspect of the present invention, there is provided an image sensing apparatus comprising a conversion member for converting a radiation wave into visual light, an image sensing area having a plurality of pixels for converting visual light converted by the converting member into an electric signal, a selector circuit for selectively reading signals from the plurality of pixels in the image sensing area, and a shielding member mounted above the selector circuit for shielding the radiation wave.

According to still another aspect of the present invention, there is provided an image sensing system comprising an image sensing apparatus including a conversion member for converting a radiation wave into visual light, an image sensing area having a plurality of pixels for converting visual light converted by the conversion member into an electric signal, a shielding member mounted in a partial area of the image sensing apparatus for shielding the radiation wave, and a selector circuit formed under the shielding member for selectively reading signals from the plurality of pixels in the image sensing area. An image signal processing circuit is provided for processing signals from the image sensing apparatus and a radiation wave generator is provided for radiating the radiation wave toward the conversion unit.

Other objects and features of the present invention will become more apparent from the following detailed description of a preferred embodiment when read in conjunction with the accompanying drawings.

DETAILED DESCRIPTION OF THE PREFERRED EMBODIMENTS

An embodiment of the present invention will be described in detail with reference to the accompanying drawings.

Figure 2:
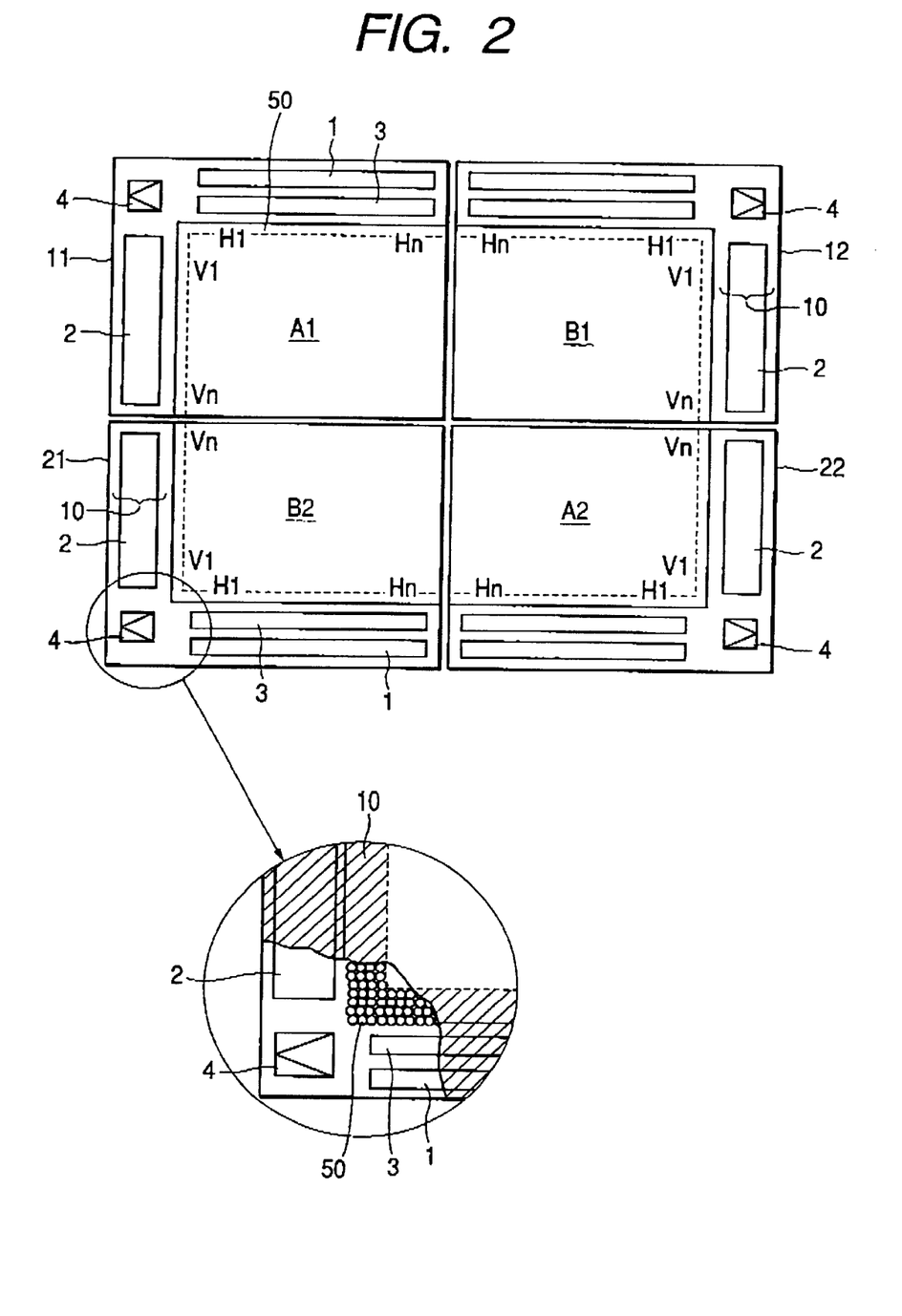
FIG. 2 shows a layout of four image sensors of an image sensing apparatus according to the present invention.

FIG. 2 is a schematic diagram showing four image sensors (i.e., image sensing units) of an image sensing apparatus formed on the same semiconductor substrate. In FIG. 2, reference numerals 11, 22, 12 and 21 represent image sensors having the same structure. The image sensors 11 and 22 are disposed in diagonal symmetry with one another, and the image sensors 12 and 21 are also disposed diagonally. The four image sensors 11, 22, 12 and 21 have image sensing areas A1, A2, B1 and B2, respectively, each area having a plurality of photoelectric conversion elements such as photodiodes disposed densely and two-dimensionally. Each of the four image sensors 11, 22, 12 and 21 has a select circuit such as a column scan circuit (HSR) 1 and a row scan circuit (VSR) 2 for selectively reading signals from a plurality of pixels in each image sensing area, a memory circuit 3 and an output amplifier 4.

The structure of the image sensor will be described by using the image sensor 11 as a representative one. The image sensing area A1 of the image sensor 11 is constituted of a plurality of photoelectric conversion elements of pixels disposed in horizontal and vertical directions. Although a pitch of pixels changes with an application field of the image sensor, an image sensing area A1 of about 15 cm square and a resolution of 50 to 100 μm are required for an x-ray human chest image sensing apparatus. In this embodiment, the pitch of pixels is assumed to be 50 μm. A reduction type CCD sensor, a CMOS sensor and the like having a pitch of 5 to 50 μm have been developed already. An image sensing apparatus having an image sensing area with a pitch of 50 μm is easy to manufacture, but a large size sensor is rather hard to manufacture. In this embodiment, since the image sensing area A1 is large, a mirror projection aligner of a 1-to-1 optical system may be used without any practical problem. Image sensors having the image sensing area A1 of about 15 cm square can be manufactured by using an 8-inch wafer. Image sensors having an image sensing area of about 20 cm square can also be manufactured by using a 12-inch wafer. The number of pixels of an image sensor having an image sensing area of 15 cm square and a pixel pitch of 75 μm is 2000×2000=4 millions.

The row scan circuit (VSH) 2 is formed along one side of the image sensing area A1. This row scan circuit 2 selects the pixel row in the vertical direction. Formed along another side of the image sensing area A1 are: a memory circuit 3 for temporarily storing pixel charge signals of the pixel row driven by the row scan circuit 2; a transistor circuit (not shown) for making active a read amplifier transistor for amplifying pixel charges; a reset circuit (not shown) for resetting residual signals on vertical signal lines; the column scan circuit (HSR) 1 for reading pixel signals from the memory circuit; and the output amplifier 4 for amplifying an output from the memory circuit 3 and externally outputting it through impedance transformation. In this image sensor, each pixel is constituted of a photodiode and an amplification MOS transistor for amplifying a signal from the photodiode and outputting it to an output line, the memory circuit is constituted of capacitors and MOS transistors, and the scan circuit and output amplifier are constituted of CMOS transistors. These are formed by CMOS processes.

An optical black pixel area (i.e., optical black area) 50 is formed between the image sensing area A1 and each of the scan circuit 2 and memory circuit 3. Pixels in this optical black pixel area 50 are covered with a light shielding member such as an Al layer for black signal clamping. Under this light shielding member, an x-ray shielding member 10 is formed.

As shown in FIG. 2, the image sensor 22 having the same structure as the image sensor 11 is disposed in diagonal symmetry with the image sensor 11, and the image sensors 12 and 21 are disposed adjacent to the image sensors 11 and 22. A coupling area of these four image sensors plays an important role in sensing either still images or moving images of an object. An image scanned from left to right in the horizontal direction and from up to down in the vertical direction becomes discontinuous in each coupling area of the four image sensors (such as a coupling area between the image sensing areas A1 and B1). It is assumed that the frame frequency is changed from 60 Hz to 600 Hz to visually remove the coupling area. In this case, if the image sensing apparatus has 4×4 million pixels=16 million pixels and the image is picked up at 30 frames/sec, then each pixel is required to be read at a frequency of 16 million×30=480 MHz. This frequency is difficult to realize by simple scanning techniques. In this embodiment, therefore, the four image sensors are driven in parallel to reduce the driving frequency to ¼frequence, and each image sensor is output from 8 lines to reduce the frequency by ⅛. The drive frequency can therefore be lowered to 480 MHz/32=15 MHz to solve the problem of discontinuity at the coupling area.

The image sensing areas A1 and B1 are scanned in parallel from V1 to Vn of the row scan circuit 2, and the image sensing areas B2 and A2 are scanned in parallel from Vn to V1 of the row scan circuit 2. The image sensing areas A1 and B2 are scanned from H1 to Hn of the column scan circuit 1, and the image sensing areas B1 and A2 are scanned from Hn to H1 of the column scan circuit 1. The x-ray shielding member mainly made of lead is formed over the optical black pixel area in order to prevent x-rays from entering the optical black pixel area which is used for mainly determining the reference potential of a clamping circuit.

Figure 3:
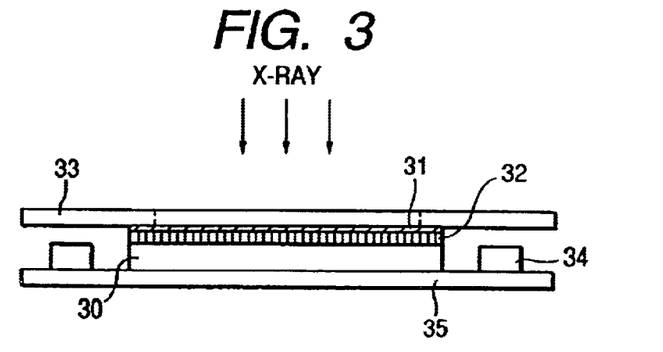
FIG. 3 is a cross-sectional view of the image sensing apparatus of the present invention.

FIG. 3 is a schematic cross-sectional view of the image sensing apparatus of this embodiment. Each of the four image sensors of the x-ray image sensing apparatus has an image sensing area having a plurality of visual light image sensing elements arranged therein. An x-ray shielding member made of lead is formed over the optical black pixel area and the peripheral circuit of the image sensor.

As shown in FIG. 3, the image sensing apparatus is constituted of image sensors 30, a light guiding member 32 for guiding fluorescent light to each image sensor 30 while attenuating x-rays to some degree, a visual light conversion member 31 for generating fluorescent light upon reception of x-rays, x-ray shielding members 33 for shielding x-rays, a mount substrate 35 for mounting the image sensor 30, and a driver 34 as a peripheral circuit disposed on the mount substrate 35 near the image sensor 30. This driver 34 drives the column scan circuits 1 and row scan circuits 2. An A/D converter may be provided as a peripheral circuit.

In this image sensing apparatus constructed as above, x-rays transmitted through a partial area of a human body become downward incident upon the visual light conversion member 31 coated with fluorescent material which emits light upon reception of x-rays. Brighter fluorescent light is generated in the area to which a larger amount of x-rays is incident. This fluorescent light is guided to the four image sensors 30 on the mount substrate 35 by the light guiding member 32, such as optical fibers which mingle with lead, to attenuate x-rays. The guided fluorescent light is converted into an image signal of an equal magnitude image by the image sensors 30. This image signal is processed by the peripheral circuits including the driver 34, A/D converter and the like, to thereby display the image on a display device or print it on a developing paper to form an x-ray photograph.

The visual light conversion member (fluorescent member: $Gd_2O_2S(Tb)$, CsI (Tl)) 31 is formed directly on the image sensor 30 or formed integrally with a fiber optic plate. The x-ray shielding member 33 is formed around the visual light conversion member to prevent x-rays from entering photoelectric conversion elements, particularly those for detecting a clamping dark level.

Figure 4:
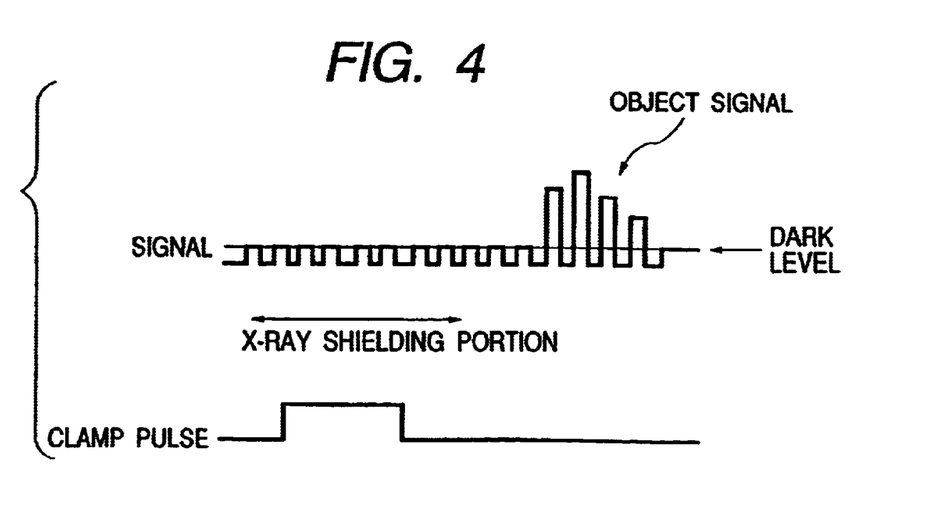
FIG. 4 shows waveforms of signals detected by the image sensing apparatus of the present invention.

FIG. 4 shows waveforms of signals detected with the image sensing apparatus of this embodiment. The x-ray shielding member 10 (shown in FIG. 2) prevents x-rays from entering the photoelectric conversion elements for detecting the clamping dark level, so that x-ray noise is not generated. Clamping can operate normally and line noise is not generated. Since the peripheral circuit is also prevented from receiving x-rays, an erroneous operation does not occur and noise is not generated.

Figure 5:
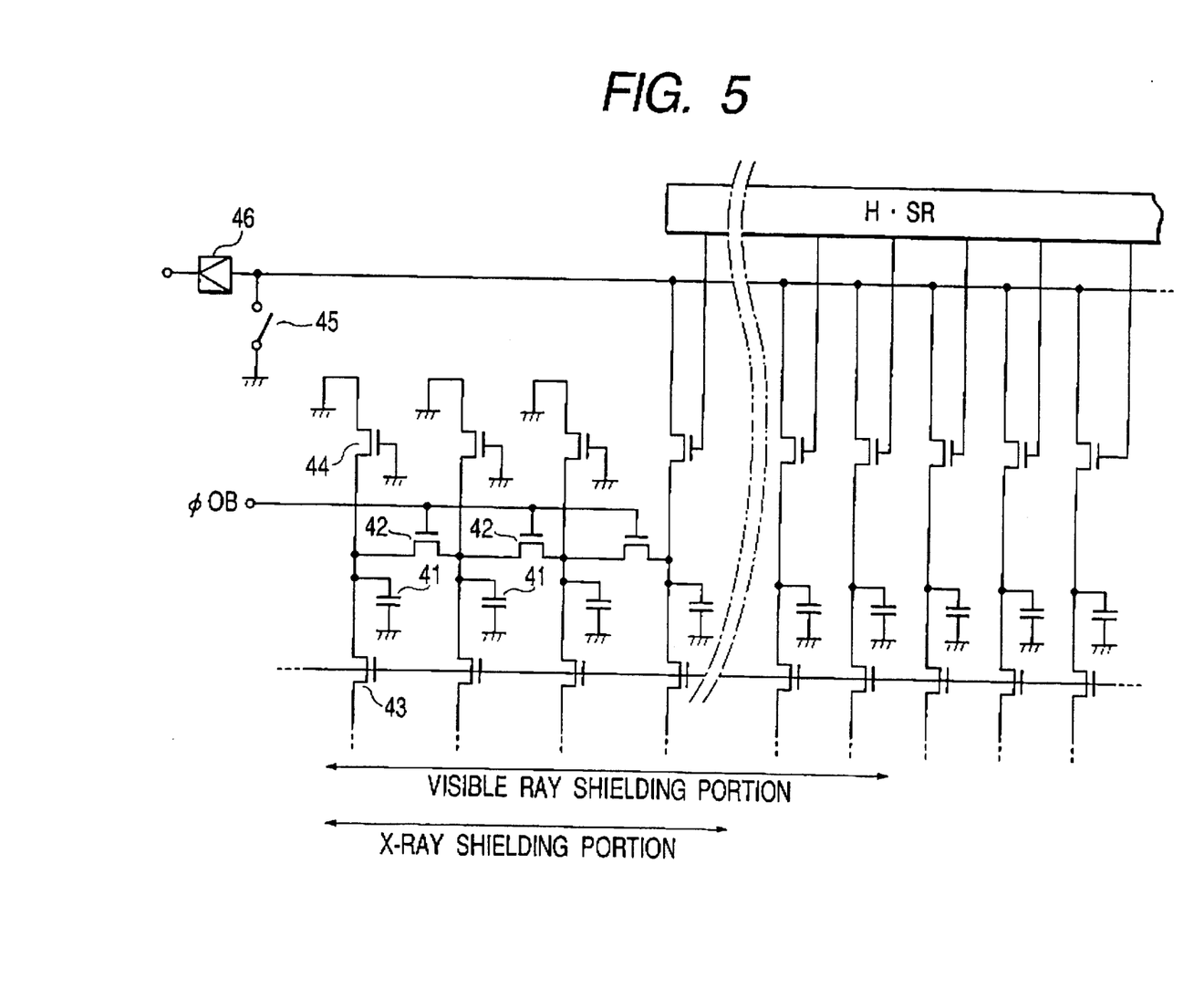
FIG. 5 is a specific circuit diagram of the image sensing apparatus of the present invention.

FIG. 5 shows the details of the memory circuit 3. Four capacitors 41 of the left side memory store pixel charges transferred via read switches 43. These stored charges are used to detect an optical black level. In order to compensate for a position misalignment of the x-ray shielding member, several tens of pixels are arranged as optical black pixels. In this embodiment, for pixels under the x-ray shielding member, electric charges of four pixels are averaged and output to the output signal line. This averaging operation can be realized by supplying an optical black pulse ΦOB to turn on switching MOS devices 42 of the four pixels corresponding to the four capacitors 41. This average optical black level is stored in a horizontal shift register HSR and amplified by an output amplifier 46. After each pixel in the image sensing area is read, a switch 45 is turned on to reset the optical black level. In this manner, the optical black (OB) signal is digitally clamped after the A/D conversion and the clamping precision can be improved.

Figure 6:
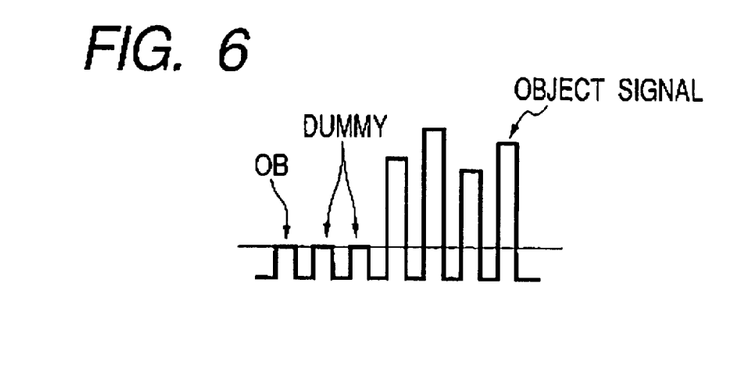
FIG. 6 shows waveforms of signals detected by an image sensing apparatus of the present invention.

FIG. 6 shows waveforms of signals in the memory circuit shown in FIG. 5. After the OB signal obtained as an average of four pixels, dummy signals are output to follow object signals. Noise components of image output signals from the image sensors are eliminated by the clamping circuit which outputs only image output signals higher than the OB clamp level which is an average of four pixels. Image signals having a high S/N ratio can therefore be obtained. Although transmission amount of x-rays is difficult to reduce, since the x-ray shielding area is formed on the pixels for the OB signal, adverse effects of x-rays upon the OB signal can be mitigated.

The material of the x-ray shielding member is currently lead (Pb). The glass fibers disposed in front of the image sensing area may be provided with an x-ray attenuating performance to some degree. However, in this case, the amount of fluorescent light is also attenuated. It is therefore most preferable to provide the x-ray shielding member on the OB signal area. Since the x-ray shielding member also covers the peripheral circuit of the image sensor, adverse effects of x-rays upon highly integrated DRAM components or the like can be mitigated.

In the embodiment described above, the image sensing apparatus senses an object image with four divided image sensors. An image sensing apparatus using one image sensor may also be used. In this embodiment, although the image sensing apparatus has an optical black pixel area, an image sensing apparatus not having an optical black pixel area may also be used. A peripheral circuit, such as the driver circuit of the present embodiment, may be mounted other than on the same chip, for example, it may be mounted in an area of the mount substrate where x-rays are not radiated.

Figure 7:
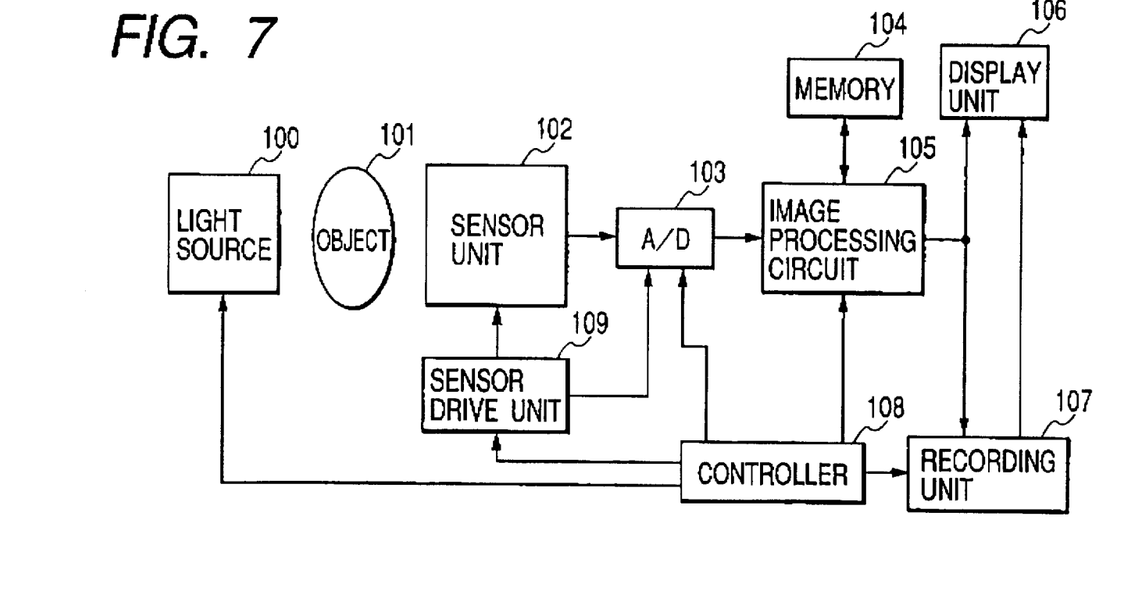
FIG. 7 is a block diagram of an image sensing system using the image sensing apparatus of the present invention.

Next, an image sensing system using the image sensing apparatus described above will be described with reference to FIG. 7. FIG. 7 is a block diagram showing the overall structure of the image sensing system.

Referring to FIG. 7, an image of an object 101 (e.g., a chest of a human body) is sensed by using radiation waves supplied from a light source 100 (x-ray source). A sensor unit 102 is constituted of the image sensors shown in FIG. 3, a fluorescent member for converting radiation waves into visual light, an x-ray shielding member, and a peripheral driver circuit.

Signals of 4×8 series (signals output to eight output lines from four image sensors) from the sensor unit 102 are converted from analog signals into digital signals by an A/D converter 103. A sensor driver unit 109 is mounted near to the sensor unit 102.

The A/D converted signal is processed for synthesis of four image signals, correction of noise caused by pixel defects, and the like, by using an image signal processing circuit 105 and a memory 104. The processed signal is stored in a recording unit 107, displayed on a display unit (monitor) 106, or printed when necessary. All these circuits and units are controlled by a controller 108.

Figure 8:
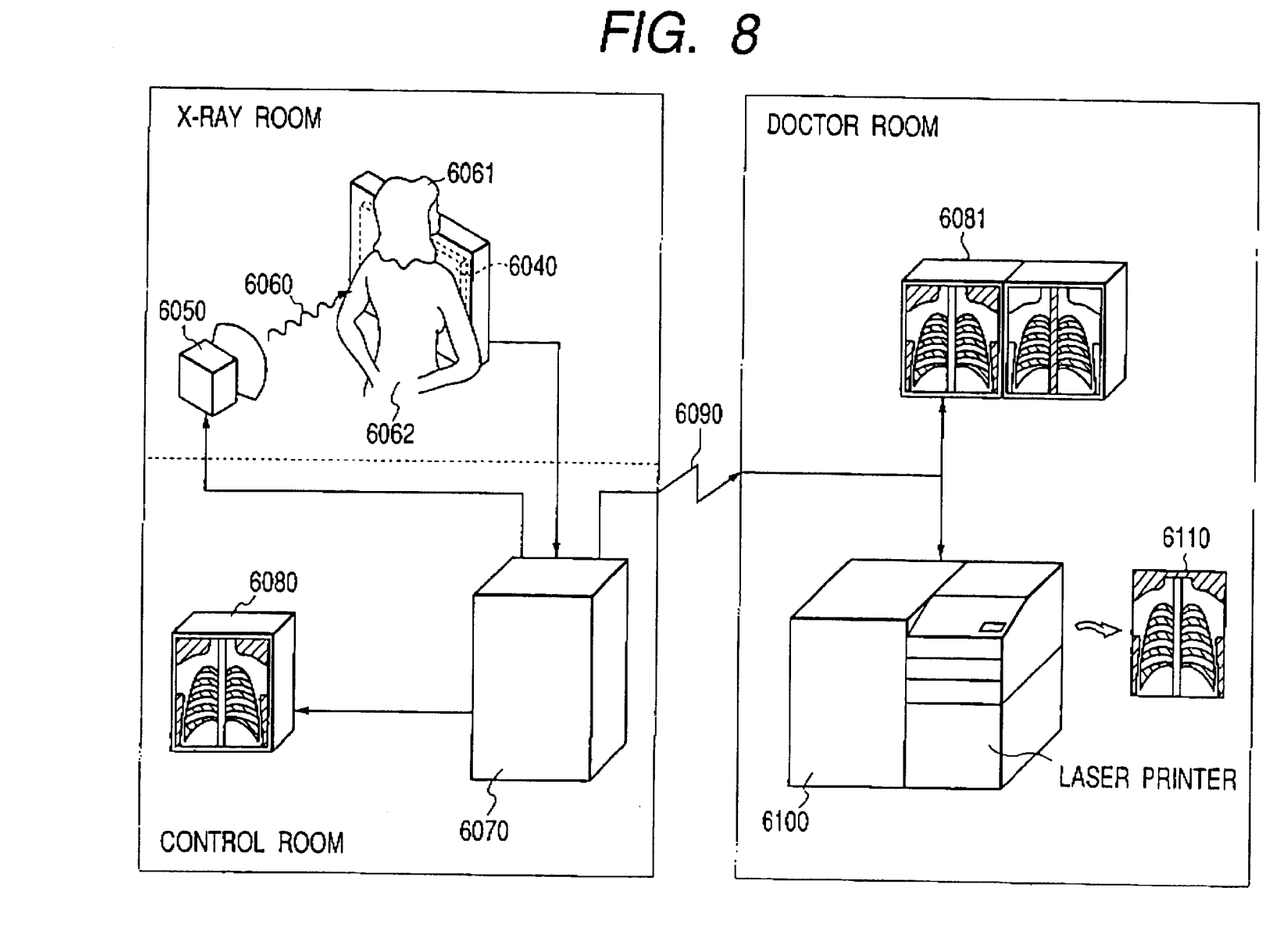
FIG. 8 is a diagram showing the image sensing system shown in FIG. 7.

FIG. 8 is a schematic diagram showing a specific example of the image sensing system (x-ray diagnosis system) using the image sensing apparatus described above.

X-rays generated by an x-ray tube 6050 transmit through a chest 6062 of a patient 6061 and become incident upon an image sensing apparatus 6040 having a scintillator mounted thereon. The incident x-rays contain information of the body of the patient 6061. In response to incidence of the x-rays 6060, the scintillator radiates light which is then photoelectrically converted to obtain electrical information. This information is converted into digital signals and processed by an image processor 6070 to display the processed signals on a display 6080 in a control room.

This information may be transmitted to a remote site via transmission means, such as a telephone line 6090, to display it on a display 6081 in another doctor room or stored in storage medium such as an optical disk, for diagnosis by a doctor at the remote site. This information may be stored in a film 6110 by using a film processor 6100. By reliably detecting the clamp level to clamp the noise components of image signals read from the image sensors, it is possible to obtain an image signal having a large dynamic range, an excellent S/N ratio, and a high contrast. Thus, diagnosis through an x-ray image can be made more correctly.

In the above embodiment, an image sensing apparatus for sensing an x-ray image has been described. Other radiation waves different from x-rays having a property of transmitting through an object may also be used. Also in such cases, a radiation wave shielding member is provided to obtain a highly stable image.

According to this embodiment, x-ray photographing with stable and high image quality can be realized by forming the x-ray shielding member in an area near the image sensing area.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image sensing apparatus comprising:
   a converting member that converts a radiation wave into visual light having a wavelength longer than that of the radiation wave;
   an image sensing unit having a plurality of photoelectric conversion portions for converting visual light converted by said converting member into an electric signal, said image sensing unit including an image sensing area and an optical black area, each of the image sensing area and the optical black area having a plurality of photoelectric conversion portions arranged such that there is space between photoelectric conversion portions;
   a scanning circuit that sequentially outputs signals from the photoelectric conversion portions, said scanning circuit being arranged on a same semiconductor substrate as said image sensing unit, at the periphery of said image sensing unit; and
   a common shielding member arranged to shield said scanning circuit and the optical black area of the image sensing unit.

2. An image sensing apparatus according to claim 1, further comprising a correcting circuit that corrects a dark level included in a signal from said image sensing area of said image sensing unit in accordance with a signal from said optical black area of said image sensing unit.

3. An image sensing apparatus according to claim 2, wherein said correcting circuit includes a clamping circuit.

4. An image sensing apparatus according to claim 2, wherein the signal from the optical black area of said image sensing unit includes a signal corresponding to an average of the signals generated by the plurality of photoelectric conversion portions of the optical black area of the image sensing unit.

5. An image sensing apparatus according to claim 1, further comprising an output amplifier shielded by said common shielding member, that amplifies and outputs the signal from said image sensing area.

6. An image sensing apparatus according to claim 1, wherein the radiation wave is an x-ray.

7. An image sensing apparatus according to claim 1, wherein said common shielding member contains lead.

8. An image sensing apparatus according to claim 1, further comprising a light guiding member, arranged between said image sensing area and said converting member, that guides the visual light onto said image sensing area, thereby reducing the radiation wave.

9. An image sensing system comprising:
   an image sensing apparatus as recited in claim 1;
   an image processing circuit that performs image processing on a signal from said image sensing apparatus; and
   a radiation wave source which irradiates radiation waves onto said converting member.

10. An image sensing apparatus comprising:
    a converting member that converts a radiation wave into visual light having a wavelength longer than that of the radiation wave;
    an image sensing sensor having an image sensing area including a plurality of pixels each of which converts visual light, converted by said converting member, into an electrical signal;
    a mounting board on which said image sensing sensor is mounted;
    a driving circuit, arranged in a peripheral area of said image sensing sensor, that drives said image sensing sensor, wherein said image sensing sensor and said driving circuit are not arranged on a same semiconductor chip;
    a light guiding member that guides visual light onto said image sensing area, thereby reducing the radiation wave, wherein said light guiding member is arranged above said image sensing area but is not arranged above said driving circuit;
    a scanning circuit that sequentially outputs signals from the photoelectric conversion portions, said scanning circuit being arranged on a same semiconductor chip as said image sensing sensor, at the periphery of said image sensing sensor; and
    a common shielding member that shields against the radiation wave, wherein said common shielding member is arranged to shield said driving circuit and said scanning circuit.

11. An image sensing apparatus according to claim 10, wherein the radiation wave is an x-ray.

12. An image sensing apparatus according to claim 10, wherein said common shielding member contains lead.

13. An image sensing system comprising:
    an image sensing apparatus as recited in claim 10;
    an image processing circuit that performs image processing on a signal from said image sensing apparatus; and
    a radiation wave source which irradiates radiation waves onto said converting member.

* * * * *

UNITED STATES PATENT AND TRADEMARK OFFICE
CERTIFICATE OF CORRECTION

PATENT NO.   : 6,627,896 B1
DATED        : September 30, 2003
INVENTOR(S)  : Seiji Hashimoto et al.

It is certified that error appears in the above-identified patent and that said Letters Patent is hereby corrected as shown below:

Column 4,
Line 27, "1/4 frequence," should read -- 1/4 frequency --.
Line 63, "downward" should read -- downwardly --.

Signed and Sealed this

Tenth Day of February, 2004

JON W. DUDAS
*Acting Director of the United States Patent and Trademark Office*